United States Patent
Glass et al.

(10) Patent No.: US 12,549,078 B2
(45) Date of Patent: Feb. 10, 2026

(54) STATOR FOR AN ELECTRIC MACHINE AND METHOD FOR MANUFACTURING A STATOR FOR AN ELECTRIC MACHINE

(71) Applicant: BorgWarner Inc., Auburn Hills, MI (US)

(72) Inventors: Thomas Glass, Rockenhausen (DE); Kai Homann, Mainz (DE); Ramona Grundmeier, Argenschwang (DE); Jan Schmolke, Bolanden (DE)

(73) Assignee: Borg Warner Inc., Auburn Hills, MI (US)

( * ) Notice: Subject to any disclaimer, the term of this patent is extended or adjusted under 35 U.S.C. 154(b) by 357 days.

(21) Appl. No.: 18/068,241

(22) Filed: Dec. 19, 2022

(65) Prior Publication Data
US 2023/0198358 A1    Jun. 22, 2023

(30) Foreign Application Priority Data
Dec. 20, 2021 (DE) .......................... 102021133905.7

(51) Int. Cl.
| | |
|---|---|
| *H02K 1/18* | (2006.01) |
| *H02K 1/04* | (2006.01) |
| *H02K 15/021* | (2025.01) |
| *H02K 15/12* | (2006.01) |

(52) U.S. Cl.
CPC ............. *H02K 15/12* (2013.01); *H02K 1/04* (2013.01); *H02K 1/18* (2013.01); *H02K 15/021* (2025.01)

(58) Field of Classification Search
CPC .......... H02K 1/04; H02K 1/18; H02K 15/021; H02K 15/12; H02K 3/345; H02K 3/38; H02K 3/487; H02K 3/522; H02K 5/08
See application file for complete search history.

(56) References Cited

U.S. PATENT DOCUMENTS 3,768,152 A * 10/1973 Swanke ................. H02K 15/12
                                                              310/260
7,453,179 B2    11/2008 Innami et al.
(Continued)

FOREIGN PATENT DOCUMENTS

| CN | 102770256 A | * 11/2012 | ........ A61M 37/0015 |
| CN | 112311172 A | * 2/2021 | ............... H02K 1/16 |
(Continued)

OTHER PUBLICATIONS

WO-03081755-A1, all pages (Year: 2003).*
(Continued)

*Primary Examiner* — Naishadh N Desai
(74) *Attorney, Agent, or Firm* — Howard & Howard Attorneys PLLC

(57) ABSTRACT

A stator for an electric machine and a method for its manufacture are specified, said electric machine having a laminated core around an axial direction that, in a first overmoulding between a first axial end and a second axial end, is surrounded by a first plastic material having several grooves, into which the stator windings having a first winding head and a second winding head that are connected to several connecting contacts are supplied, wherein in a second overmoulding, a second plastic material fills the grooves around the stator windings and at least covers regions outside of the first winding head on the first axial end and outside of the second winding head on the second axial end.

16 Claims, 4 Drawing Sheets

(56) References Cited

U.S. PATENT DOCUMENTS

Figure 1:
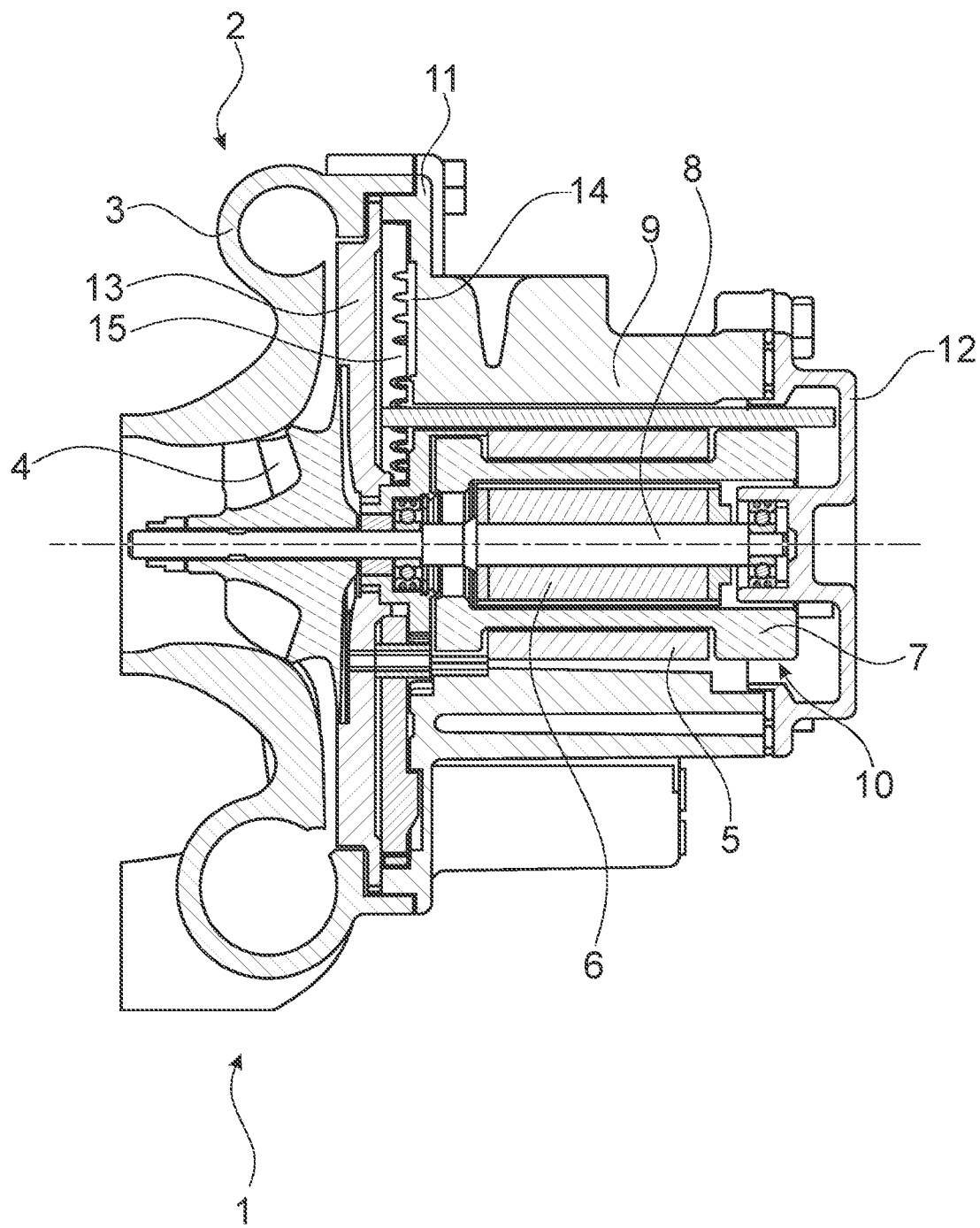

| | | | | |
|---|---|---|---|---|
| 2003/0205945 A1* | 11/2003 | Ioi | ............... | F04C 23/008 |
| | | | | 310/215 |
| 2009/0167101 A1* | 7/2009 | Saga | ............... | H02K 15/12 |
| | | | | 29/596 |
| 2009/0179506 A1* | 7/2009 | Saga | ............... | H02K 9/223 |
| | | | | 310/215 |
| 2016/0164362 A1* | 6/2016 | Lehner | ............... | H02K 3/38 |
| | | | | 29/605 |
| 2017/0085140 A1* | 3/2017 | Tang | ............... | H02K 11/00 |

FOREIGN PATENT DOCUMENTS

| | | | | |
|---|---|---|---|---|
| DE | 102011108042 A1 | 1/2012 | | |
| DE | 102010064051 A1 | 6/2012 | | |
| EP | 0079100 A1 * | 1/1982 | | |
| EP | 2256901 A2 | 12/2010 | | |
| GB | 742345 A * | 11/1953 | | |
| JP | 4076837 B2 | 4/2008 | | |
| WO | WO-03081755 A1 * | 10/2003 | ............. | H02K 11/33 |
| WO | WO-2013133337 A1 * | 9/2013 | ............... | H02K 3/30 |

OTHER PUBLICATIONS

CN-102770256-A, all pages (Year: 2012).*
CN-112311172-A, all pages (Year: 2021).*
EP-0079100-A1, all pages (Year: 1982).*
GB-742345-A, all pages (Year: 1953).*
WO-2013133337-A1, all pages (Year: 2013).*

* cited by examiner

STATOR FOR AN ELECTRIC MACHINE AND METHOD FOR MANUFACTURING A STATOR FOR AN ELECTRIC MACHINE

CROSS-REFERENCE TO RELATED APPLICATIONS

This application claims priority pursuant to 35 U.S.C. 119(a) to German Application No. 102021133905.7, filed Dec. 20, 2021, which application is incorporated herein by reference in its entirety.

FIELD

The invention relates to a stator for an electric machine and a method for manufacturing a stator for an electric machine.

BACKGROUND

It is known from the prior art to provide stators for electric machines, e.g., electric motors, with a plastic cover. Different winding techniques are further known, wherein winding stator windings on placeholders, with subsequent transfer to the intended position in the stator, is described as retraction winding technique. In winding techniques of this kind, which generate wild windings in the stator, it is conventionally provided to manufacture the plastic cover by casting (also described as "potting" in the following) without pressure. Cast stators are established in the art, but require a processing time of several hours that is comprised of a plurality of process steps, whereby the manufacturing costs increase significantly. The manufacture begins with shaping the stators in casting moulds, pre-heating, stirring, casting and vacuum pulling. After putting the components in an oven and gelling them, the components are removed from the oven again, and hardening, demoulding and deburring follows.

A stator for an electric machine and a method for its manufacture are known from DE 10 2011 108 042 A1, in which a majority of individual tooth segments are combined into a stator ring, clamped to one another and recast at least in some regions with a potting compound in such a way that a stator carrier is formed.

A winding carrier part for constructing a winding carrier to be set up on a tooth structure of an electric machine is known from DE 10 2010 064 051 A1, comprising a base part whose cross-section is in particular formed in a U-shape, a winding carrier collar that is arranged on one end of the base part, positioning structures arranged on the winding carrier collar for holding connecting portions of the winding wire, and a guide element for guiding at least one of the connecting portions of the winding wire.

A moulded motor is known from EP 2 256 901 A2 that has a column-shaped stator and a motor housing that is provided on an end face of the stator. The stator contains a plurality of yoke segments that are arranged in a circumferential direction of the stator and a moulded portion that is configured such that it moulds the plurality of yoke segments. The motor housing has an outer wall that is provided along the outer circumferences of the plurality of yoke segments. The outer wall is lower in height than the moulded part in the axial direction of the stator.

U.S. Pat. No. 7,453,179 B2 describes a brushless direct current motor. The stator core of the motor comprises a ring-shaped back core and a plurality of T pieces that are manufactured separately from the back core and fixed on the inner circumference of the back core. A stator coil is wound on each of the T pieces via a split or concentrated winding method. The stator core and the stator coil are formed via said method.

An isolator is known from JP 4076837 B2, around which a winding is wound that is used in an electric motor having rotating magnetic fields.

Based on the prior art, the inventors have now taken on the task of creating a stator for an electric machine or providing a method for manufacturing a stator for an electric machine that overcomes the problems specified above, such that the manufacturing time is reduced, and the thermal properties of a stator cover are simultaneously improved.

SUMMARY

This object is achieved by the features of the independent patent claims 1 and 11. Further advantageous embodiments of the invention are respectively the subject matter of the dependent claims. These can be combined with each other in a technologically sensible manner. The description, in particular in connection with the drawing, additionally characterises and specifies the invention.

A stator for an electric machine is created according to the invention having a stator laminated core around an axial direction that, in a first overmoulding between a first axial end and a second axial end, is surrounded by a first plastic material having several grooves, into which the stator windings having a first winding head and a second winding head that are connected to several connecting contacts are supplied, wherein in a second overmoulding, a second plastic material fills the grooves around the stator windings and at least covers regions outside of the first winding head on the first axial end and outside of the second winding head on the second axial end.

A stator is then formed by means of a first overmoulding and a second overmoulding instead of the casting that has previously been standard. A one-piece component is then additionally formed from the laminated core and first plastic material with the first overmoulding, in which the grooves for the stator windings are arranged. A more compact construction can be generated via the position of the grooves in the first plastic material of the first overmoulding, enabling a shorter construction in the axial direction due to the insertion of the stator windings in the grooves. The more compact construction occurs via the first overmoulding on the end faces of the stator laminated core. Contrastingly, a spacing between the winding heads and the stator laminated core must be maintained during casting with epoxide resin according to the prior art.

The plastic layer on the end faces forms the necessary insulation in the first overmoulding with plastic according to the invention, and the winding heads can thus be formed directly on the plastic on the end faces, whereby the stator becomes more compact. It is additionally possible to obtain correspondingly shorter cycle times in the manufacturing via the first overmoulding and the second overmoulding, and additionally to obtain an improved thermal conductivity via a suitable selection of the first or second plastic materials. An improvement of the contact sleeve position and an improved maintenance of the degree of pollution is additionally obtained, as insulating varnish is enclosed in the region between the wires and the contact sleeve. The first axial end or the first winding head could also be described as a cable end or cable winding head, and the second axial end or second winding head could also be described as a non-cable end or non-cable winding head due to the position of the cable feed. The description as specified above will be maintained in the following, however.

According to an embodiment of the invention, the grooves are arranged along the axial direction and formed open on an inner side, wherein the stator windings are formed as wild windings with a retraction winding technique in the grooves.

Following this approach, the overmoulding of the stator is combined with the technique of retraction winding, such that the stator windings come to rest in the connecting contacts as wild windings. A winding technique of this kind can be manufactured simply and cost-effectively, as the stator windings can be provided on corresponding placeholders, for example, such that these can then be placed in the corresponding connecting slots. The arrangement of the grooves in the axial direction and having a form opened inwards allows an insertion of the stator windings in the grooves.

According to an embodiment of the invention, the second winding head is provided with a protective cap on the second axial end that is covered by the second plastic material.

It may be possible to cover the second winding head on the second axial end by means of the plastic material as a protective coat, but a protective cap formed as a separate insertion component here leads to additional protection in the event of mechanical or process-related requirements.

According to an embodiment of the invention, the connecting contacts are arranged on the first axial end and fixed in a positioning disc that covers the first winding head of the stator windings on the first axial end.

An improvement of the position precision of the connecting contacts in relation to one another and to external components is additionally possible due to the fixing of the connecting contacts in the positioning disc, which additionally makes the further mounting steps easier and leads to less waste. The advantages obtainable according to the invention lead overall to a cost reduction when the stator according to the invention is used for an electric machine that can for example be a brushless electric motor as it is in particular frequently used in automotive technology, for example in the field of electric compressors or turbochargers.

According to a further embodiment of the invention, the first plastic material is implemented as a first overmoulding, and the second plastic material as a second overmoulding in an injection moulding method.

It is accordingly possible to apply the two plastic materials in the injection moulding method, such that production of the stator according to the invention is possible with short cycle times after providing corresponding injection moulds both for the first overmoulding and for the second overmoulding.

According to a further embodiment of the invention, the first plastic material is formed such that the stator laminated core is electrically insulated from the stator windings in the axial direction, preferably by a spacer formed from the first plastic material on end faces on both axial ends.

A reduction of the measurements in the axial direction occurs via the plastic material on the end faces on the two axial ends. The use of otherwise standard groove insulation papers in the form of paper strips between the stator laminated core and the stator windings is thus made unnecessary by this additional spacer.

According to a further embodiment of the invention, the properties of the first plastic material or the second plastic material are coordinated with each other with regards to their flow properties and their thermal conductivity.

In contrast to casting, injection moulding is not a pressure-free processing, such that the plastic materials used must have a particular flow property in order to be able to completely fill the cavities within the injection mould. The thermal conductivity should here be as high as possible, such that the temperature within the stator does not increase too significantly within the stator during the operation of an electric machine. It is thus necessary to select the material qualities for each of the two plastic materials correspondingly, such that an optimum can be obtained.

According to a further embodiment of the invention, the first axial end and the second axial end are connected to temporary channels made of second plastic material in order to transfer the second plastic material from the region of the positioning disc to the region of the protective cap in a fluid form during manufacture.

The provision of temporary channels proves advantageous in an injection moulding method, as the fluid plastic material can reach the positions further away without air locks without cooling or setting. The temporary channels are here generated via corresponding cavities in an injection mould, and can be formed such that they can be easily separated from the completed stator.

According to a further embodiment of the invention, the first plastic material is formed as a liquid crystalline polymer having a mineral filling. The first plastic material can here have a thermal conductivity of approximately 9 W/mK. The second plastic material can further be modified with regards to its thermal conductivity, and in particular formed as a thermoplastic material, preferably polyphenylene sulphide (PPS). The second plastic material can here have a thermal conductivity of approximately 2 W/mK.

The specified plastic materials having the cited specifications enable a manufacturing with applied pressure to be carried out via injection moulding methods carried out one after another. The cycle times of the combined process steps are here significantly reduced in comparison with conventional casting.

A method for manufacturing a stator for an electric machine is additionally specified according to the invention, in which the following steps are carried out:
provision of a stator laminated core,
carrying out of a first overmoulding of the stator laminated core having several grooves made from a first plastic material formed along an axial direction,
insertion of stator windings in the grooves,
connection of the stator windings having several connecting contacts, and
carrying out of a second overmoulding to fill the grooves around the stator windings with second plastic material.

The stator laminated core is then accordingly provided by the first overmoulding, such that grooves for receiving the stator windings formed by means of retraction winding technique are created, winding heads are formed and are then connected to the connecting contacts. Overall, a one-piece component is formed. As the overmouldings are carried out in an injection moulding method, a clear reduction of the cycle times in comparison with conventional casting during production of a stator for an electric machine results.

According to a further embodiment of the method according to the invention, the following further steps are carried out before the second overmoulding is carried out:
fixing of the connecting contacts in a positioning disc covering a first axial end, and
covering of an opposite second axial end having a protective cap.

The two axial ends are covered by the positioning discs having connecting contacts fixed within them and the protective cap, such that the outer regions around the protective cap and the positioning disc are covered by the second plastic material when the grooves around the stator windings are simultaneously filled after a second overmoulding.

According to an embodiment of the method according to the invention, the step of carrying out the second overmoulding in an injection mould is carried out such that the positioning disc is fixed together with the connecting contacts, via holding grooves, in the injection mould.

The position precision of the connecting contacts relative to each other or to external components or to the stator is thus improved, which makes the connection of the electric machine to other components easier or reduces the rate of waste.

According to an embodiment of the method according to the invention, the step of carrying out the second overmoulding is carried out in such a way that channels are formed in the injection mould between the first axial end and the second axial end in order to transfer the second plastic material as temporary channels from the region of the positioning disc to the region of the protective cap in a fluid form.

It is therefore ensured that the fluid second plastic material can fill all the cavities before cooling. This approach additionally contributes to the stabilisation of the non-cable winding head, such that the winding head is not pushed away from the stator laminated core by the second plastic material during the second overmoulding.

An electric motor having a stator as described above is additionally specified.

The electric motor can be a component of a charging device, but also of other components, in particular from automotive construction.

A charging device for an internal combustion machine, in particular in a vehicle, is finally specified, wherein the charging device has a compressor driven by an electric motor or an electric motor optionally also operable as a generator or a turbine-driven compressor, wherein the electric motor is formed having a stator as described above.

A charging device having a compressor driven by an electric motor has stators, wherein a construction according to the invention can be used in order to reduce the production times and thus also the production costs and the mechanical dimensions. The use of the stator according to the invention is advantageous for an electric machine of this kind, which can be a brushless electric motor, for example, and is in particular used in automotive technology, for example in the field of electric compressors, or also generally in combination with a turbine side having a turbine housing and a turbine wheel located within said housing in the case of electrically supported turbocharging.

BRIEF DESCRIPTION

Figure 2:
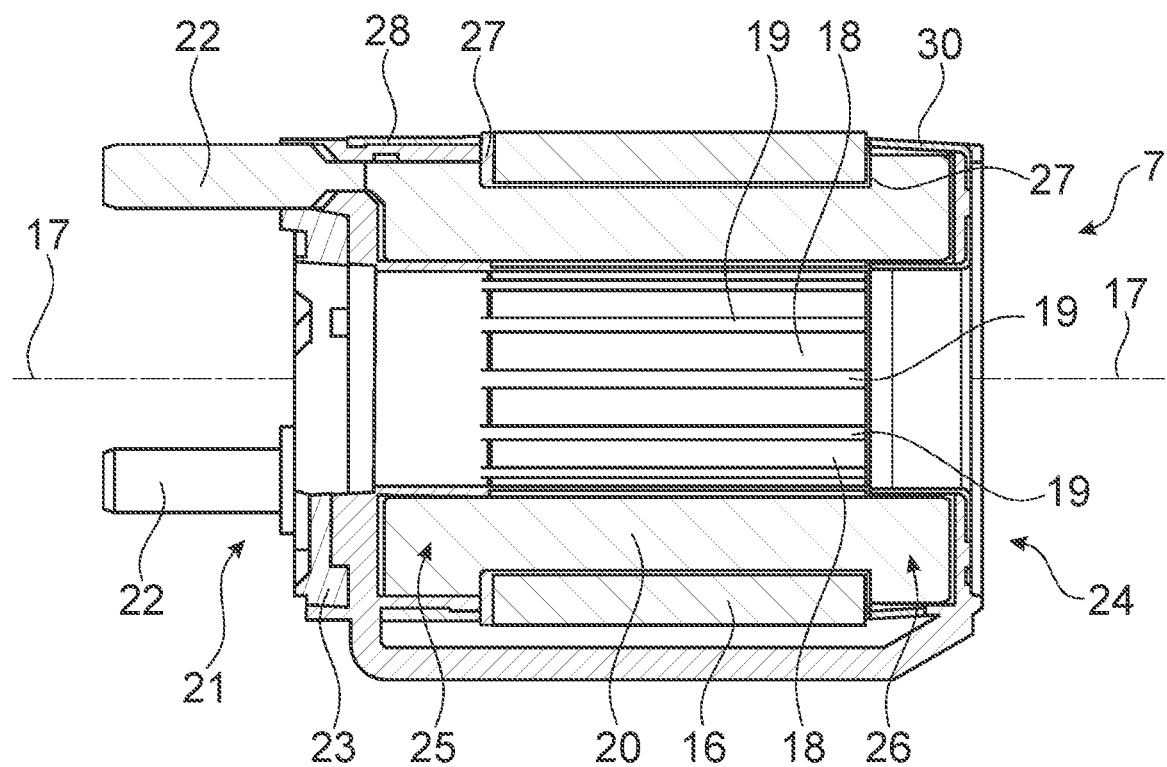
Figure 3:
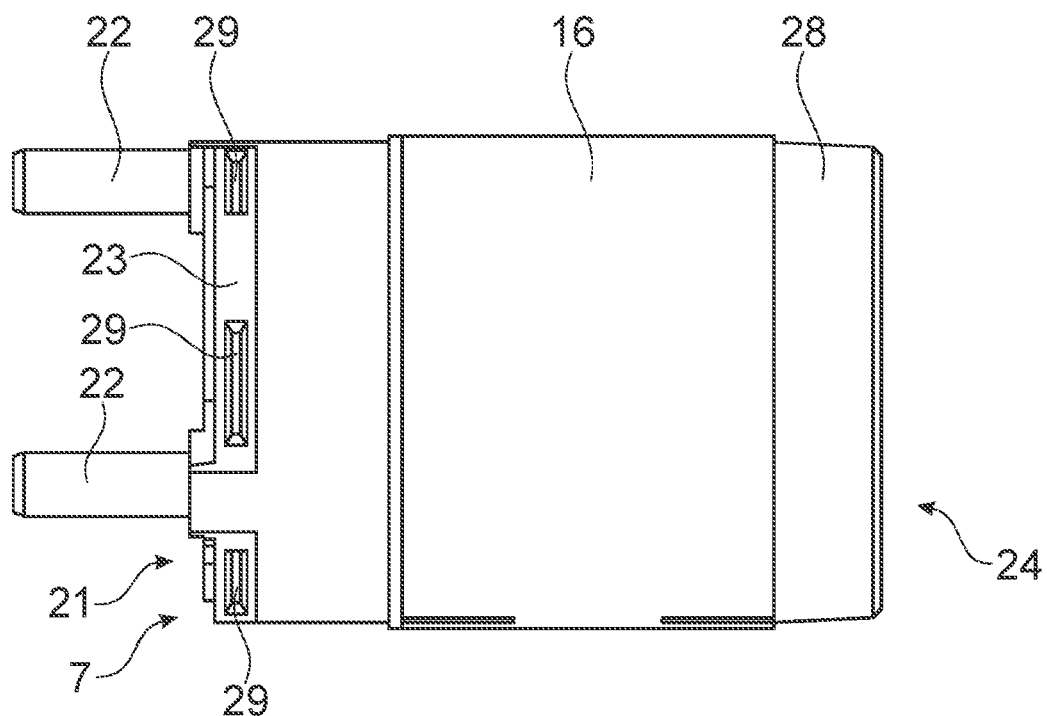
Figure 4:
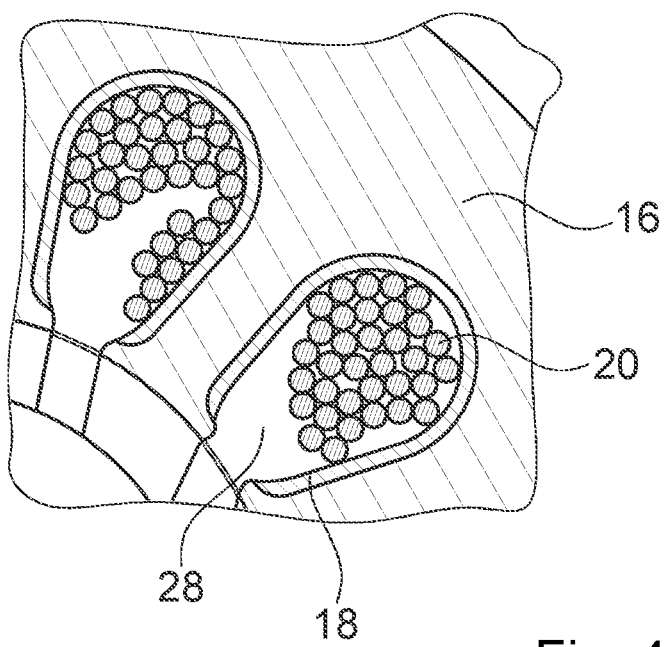
Figure 5:
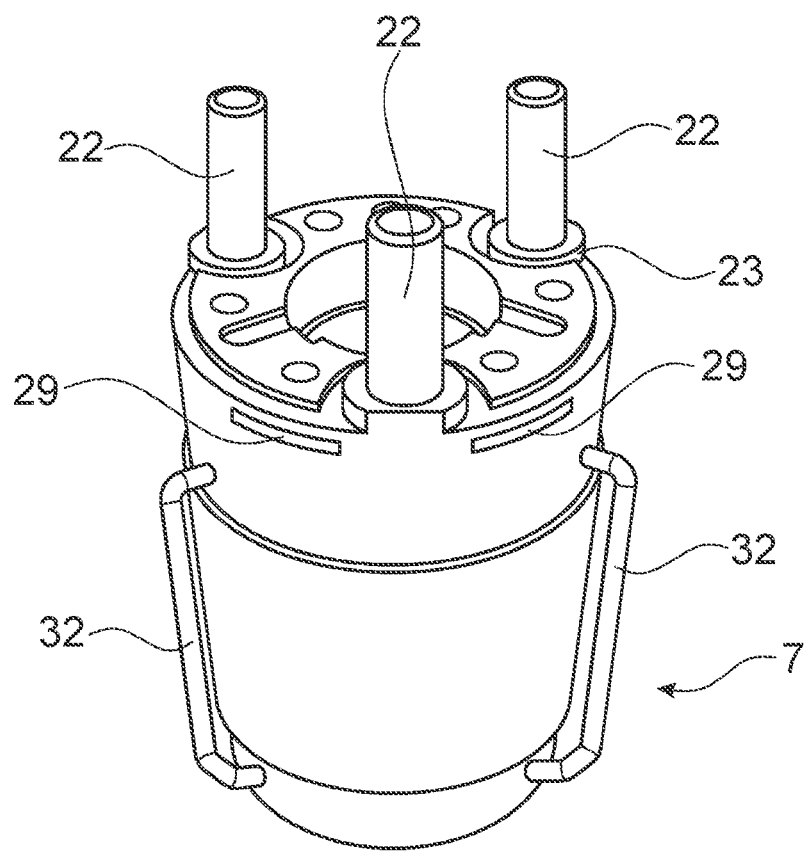
Figure 6:
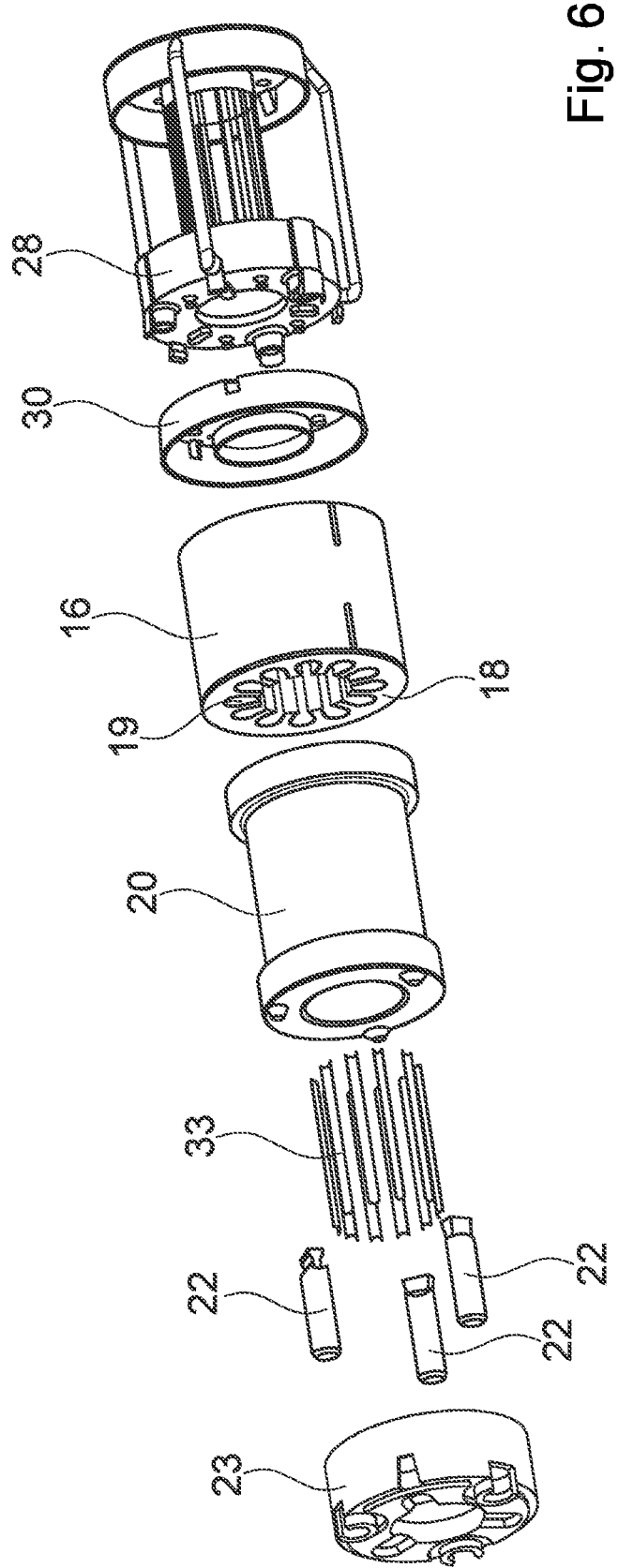

Several exemplary embodiments are described in more detail in the following with reference to the drawing, in which:

FIG. 1 shows a charging device for an internal combustion machine in a cross-sectional depiction, FIG. 2 shows an embodiment of a stator according to the invention in a cross-sectional view, FIG. 3 shows the stator according to the invention from FIG. 2 in a side view, FIG. 4 shows a detailed view of the stator according to the invention from FIG. 2 in a cross-sectional view, FIG. 5 shows the stator according to the invention from FIG. 2 in a perspectival side view, FIG. 6 shows the stator according to the invention from FIG. 2 in a perspectival exploded depiction after going through the method steps for its manufacture.

DETAILED DESCRIPTION

Identical components or components functioning in an identical manner are provided with the same reference numerals in the figures.

A charging device 1 according to an embodiment is described in detail in the following with reference to FIG. 1, in which the stator according to the invention can preferably be used. A use in a charging device 1 of this kind is only provided in an exemplary form, however, as other usage cases of the stator according to the invention would also be possible.

FIG. 1 shows the charging device 1 in a cross-sectional view, comprising a compressor 2. The compressor 2 has a compressor housing 3. A compressor wheel 4 is arranged in the compressor housing 3. This compressor wheel 4 is located in the so-called compressor chamber. The charging device 1 further comprises an electric motor 5. The electric motor 5 is composed of a rotor 6 and a stator 7. The rotor 6 is rotationally connected to the compressor wheel 4 via a shaft 8. The compressor wheel 4 is thus set in rotation by rotating the rotor 6. The compressor wheel 4 and the rotor 6 are arranged coaxially, such that the shaft 8 is simultaneously also the rotor shaft.

Air is sucked in the axial direction when the rotor 6 rotates, and thus when the compressor wheel 4 rotates. The air is compressed in the radial direction via the compressor 2, and an internal combustion machine is supplied.

The charging device 1 further comprises a motor housing 9. A motor chamber 10 is formed in this motor housing 9. The motor chamber 10 is closed by means of a lid 12 on the side turned away from the compressor 2. The motor chamber 10 is delimited by a wall 11 of the motor housing 9 up to the compressor 2. The compressor housing 3 is open on its side facing the motor housing 9. This open side is closed by means of a back wall 13. Means (not shown) that provide a defined axial positioning of the back wall 13 relative to the compressor housing can be provided on the back wall 13 on a side facing the compressor 2.

The motor housing 9 is fixedly connected to the compressor housing 3 with its wall 11, in particular screwed. An intake chamber 14 is here formed between the back wall 13 and the wall 11. Power electronics 15 for providing power and controlling the electric motor 5 are located in this intake chamber 14. The intake chamber 14 is hermetically sealed in relation to the compressor chamber and in relation to the motor chamber 10.

An embodiment of the stator 7 according to the invention is shown in a side view in FIG. 2. The stator 7 comprises a typically cylindrical stator laminated core 16 that is arranged around an axial direction 17 that runs within the stator 7. The stator laminated core 16 is provided with a first plastic material 18 as a first overmoulding that has a plurality of grooves 19 on the inner side towards the axial direction 17 that are also arranged substantially in parallel to the axial direction 17. Stator windings 20 (only depicted schematically in FIG. 2) are installed in the grooves 19, which end on a first axial end 21 in several connecting contacts 22. The connecting contacts 22 are connected to the stator windings 20, for example by means of clamping (crimping).

A positioning disc 23 is arranged on the first axial end 21 that is used to receive and fix the connecting contacts 22. The stator windings 20 usually respectively have a winding head both on their side facing the first axial end 21 and on their side facing a second axial end 24, said winding head connecting the stator windings running along the grooves 19 to one another. The winding head is schematically labelled in FIG. 2 with the reference numeral 25 for the first winding head or 26 for the second winding head.

Spacers are formed by means of the first plastic material in order to prevent electrical short-circuits between the stator laminated core 16 and in particular the first winding head 25, said spacers holding the first winding head 25 spaced apart from the stator laminated core 16. The stator 7 is embedded in a second plastic material 28 that is implemented as a second overmoulding, such that the positioning disc 23 is implemented as a one-piece component with the remaining components together with the connecting contacts 22, wherein the second overmoulding either covers the second winding head, or otherwise at least partially overmoulds a protective cap 30 as shown in FIG. 2 in the region of the second axial end 24. The stator windings 20 are likewise filled by the second plastic material 28 within the grooves 19.

As a result, a compact stator 7 is obtained, in which the stator windings 20 are protected outwards by means of the second plastic material 28 and the positioning disc 23 or the protective cap 30, and the positions of the connecting contacts 22 are precisely determined via the positioning disc 23.

A space-saving construction of the stator 7 can be obtained due to the first overmoulding with the first plastic material 18, which functions as a spacer, as the groove insulation paper known from the prior art can be dispensed with as paper insulation between the stator laminated core 16 and the stator windings 20. A stator 7 constructed in this manner additionally has better thermal properties, as a correspondingly high thermal conductivity can be obtained in particular via the selection of the first plastic material 18 and the second plastic material 28. The usage of plastic materials additionally allows a mechanically stable construction that has a good insulation from the environment.

The first plastic material 18 is formed as a liquid crystalline polymer having a mineral filling. The first plastic material 18 can here have a thermal conductivity of approximately 9 W/mK.

The second plastic material 28 is modified with regards to its thermal conductivity, and can in particular be formed as a thermoplastic material, preferably polyphenylene sulphide (PPS). The second plastic material 28 can here have a thermal conductivity of approximately 2 W/mK.

The specified plastic materials for the first plastic material 18 and the second plastic material 28 having the cited specifications enable manufacturing with applied pressure via injection moulding methods carried out one after another. The cycle times of the combined process steps are here significantly reduced in comparison with conventional casting.

In FIG. 3, the stator 7 is shown in a side view. It can be seen that the outer side of the second plastic material 28 and the connecting contacts 22 and the positioning disc 23 are formed in addition to the stator laminated core 16. The second overmoulding with the second plastic material 28 occurs in an injection mould provided for the purpose, wherein the positioning disc 23 can be installed in the injection mould via holding grooves 29 lying radially outwards, such that the fixing of the positioning disc 23, and consequently also the connecting contacts 22, can occur with high precision and in particular in a reproducible manner. This simplifies the further use of the stator 7 significantly, as components corresponding to the connecting contacts 22 can provide lower intake tolerances. The waste of components in the further construction of an electric machine, e.g., the electric motor 5 described above, is thus also reduced.

The arrangement of the stator windings 20 within the grooves 19 is explained again in more detail in connection with FIG. 4. The depiction according to FIG. 4 represents a cut through the stator laminated core 16 together with the first overmoulding from the first plastic material 18, which is substantially shown perpendicularly to the axial direction 17 in a slightly perspective depiction. It can be seen that the stator winding 20 is formed as a so-called wild winding by means of retraction winding technique, wherein the stator windings 20 are arranged within the grooves 19. The grooves 19 are filled with the second plastic material 28. The first plastic material 18 thus forms the part of the stator 7 that receives the stator winding 20 together with the stator laminated core 16, wherein the second overmoulding with the second plastic material 28 contributes outwardly for the electrical insulation and the thermal conductivity.

In FIG. 5, the stator 7 is shown again in a perspective side view after all the method steps have ended. In order to obtain an even distribution of the second plastic material 28 in fluid form, it is provided that corresponding channels are formed in the injection moulding tool that reach from the region of the positioning disc 23 to the protective cap 30, such that when the fluid plastic material is introduced from the first axial end 21, this does not need to be pressed through the grooves 19 in order to be able to reach the second axial end 24. It can thus be ensured that the second plastic material 28 can fill all the cavities between the first axial end 21 and the second axial end 24 before it cools. The temporary channels created here are labelled with the reference numeral 32 in FIG. 5. These channels can easily be split by a corresponding formation on the transition to the outer side of the stator 7, as they are unnecessary for the later function of the stator 7.

The complete construction of the stator 7 is shown again in an exploded depiction with reference to FIG. 6. The arrangement of the stator laminated core 16 and the first plastic material 18 as first overmoulding having the grooves 19 formed in it can be seen lying approximately in the centre. The stator winding 20 is only schematically depicted in turn. The grooves 19 are further covered with the so-called slot wedges 33 from the inner side. The stator windings 20 are connected to the connecting contacts 22 in the direction of the first axial end 21. The positioning disc 23 forms the end on the first axial end. The protective cap 30 is located on the opposite side of the second axial end 24. The second overmoulding formed from the second plastic material 28 is schematically depicted with all its components, including the temporary channels 32 on the right image side.

In a manufacturing method according to the invention, the stator laminated core 16 is first provided with the first overmoulding of first plastic material 18, such that grooves 19 for receiving the stator windings 20 formed by means of retraction winding technique are created that are connected to the connecting contacts 22. The two axial ends 21, 24 are covered by the positioning discs 23 having the connecting contacts 22 fixed within them and the protective cap 30, such that the outer regions around the protective cap 30 and the positioning disc 23 are covered by second plastic material 28 when the grooves 19 around the stator windings 20 are simultaneously filled after a second overmoulding, such that the stator 7 forms a one-piece component overall. As the overmouldings are formed by an injection moulding method, a clear reduction of the cycle times in comparison with conventional casting in the manufacture of the stator 7 for an electric machine results.

The features specified previously and in the claims, and which can be understood from the figures, can be advantageously provided both individually and in different combinations. The invention is not limited to the exemplary embodiments described, but can be modified within the scope of the ability of a person skilled in the art in several ways.

REFERENCE NUMERALS

1 charging device
2 compressor
3 compressor housing
4 compressor wheel
5 electric motor
6 rotor
7 stator
8 shaft
9 motor housing
10 motor chamber
11 wall
12 lid
13 back wall
14 intake chamber
15 power electronics
16 stator laminated core
17 direction
18 first plastic material
19 grooves
20 stator winding
21 first axial end
22 connecting contact
23 positioning disc
24 second axial end
25 first winding head
26 second winding head
27 spacer made of first overmoulding material
28 second plastic material
29 holding grooves
30 protective cap
32 temporary channel
33 slot wedge

What is claimed is:

1. A stator for an electric machine, the stator comprising:
a stator laminated core arranged around an axial direction;
a first overmoulding comprising a first plastic material surrounding the stator laminated core between a first axial end and a second axial end and having several grooves into which stator windings having a first winding head and a second winding head that are connected to several connecting contacts are supplied; and
a second overmoulding comprising a second plastic material which fills the grooves around the stator windings and at least covers regions outside of the first winding head on the first axial end and outside of the second winding head on the second axial end;
wherein the second winding head is provided with a protective cap on the second axial end that is covered by the second plastic material;
wherein the connecting contacts are arranged on the first axial end and fixed in a positioning disc that covers the first winding head of the stator windings on the first axial end; and
wherein the first axial end and the second axial end are connected to temporary channels made of the second plastic material in order to transfer the second plastic material from a region of the positioning disc to a region of the protective cap in a fluid form during manufacture.

2. The stator according to claim 1, wherein the grooves are arranged along the axial direction and are formed open on an inner side, wherein the stator windings are formed in the grooves as wild windings by a retraction winding technique.

3. The stator according to claim 1, wherein the second winding head is provided with a protective cap on the second axial end that is covered by the second plastic material.

4. The stator according to claim 1, wherein the connecting contacts are arranged on the first axial end and fixed in a positioning disc that covers the first winding head of the stator windings on the first axial end.

5. The stator according to claim 1, wherein the first plastic material is formed such that the stator laminated core is electrically insulated from the stator windings in the axial direction.

6. The stator according to claim 1, wherein the properties of the first plastic material and the second plastic material are coordinated with each other with regards to their flow properties and their thermal conductivity.

7. The stator according to claim 1, wherein the first plastic material is formed as a liquid crystalline polymer having a mineral filling.

8. The stator according to claim 1, wherein the second plastic material is modified with regards to its thermal conductivity and is formed as polyphenylene sulphide.

9. A method for manufacturing the stator according to claim 1.

10. An electric motor having a stator according to claim 1.

11. A charging device for an internal combustion machine, wherein the charging device has a compressor driven by an electric motor having a stator according to claim 1.

12. The charging device according to claim 11, wherein the electric motor is operable as a generator.

13. The charging device according to claim 11, wherein the compressor is turbine-driven.

14. The stator according to claim 5, wherein the first plastic material is formed such that the stator laminated core is electrically insulated from the stator windings in the axial direction by a spacer formed from the first plastic material on end faces on both axial ends.

15. The stator according to claim 7, wherein the first plastic material has a thermal conductivity of approximately 9 W/mK.

16. The stator according to claim 8, wherein the second plastic material has a thermal conductivity of approximately 2 W/mK.

* * * * *